Feb. 16, 1960 H. G. RATH ET AL 2,925,170
WIRE FEEDER
Filed May 9, 1956 3 Sheets-Sheet 1

INVENTORS
HOWARD G. RATH
ALFRED J. MILLER
JOHN A. KRATZ
BY Richard S. Shreve
ATTORNEY Feb. 16, 1960 H. G. RATH ET AL 2,925,170
WIRE FEEDER
Filed May 9, 1956 3 Sheets-Sheet 2
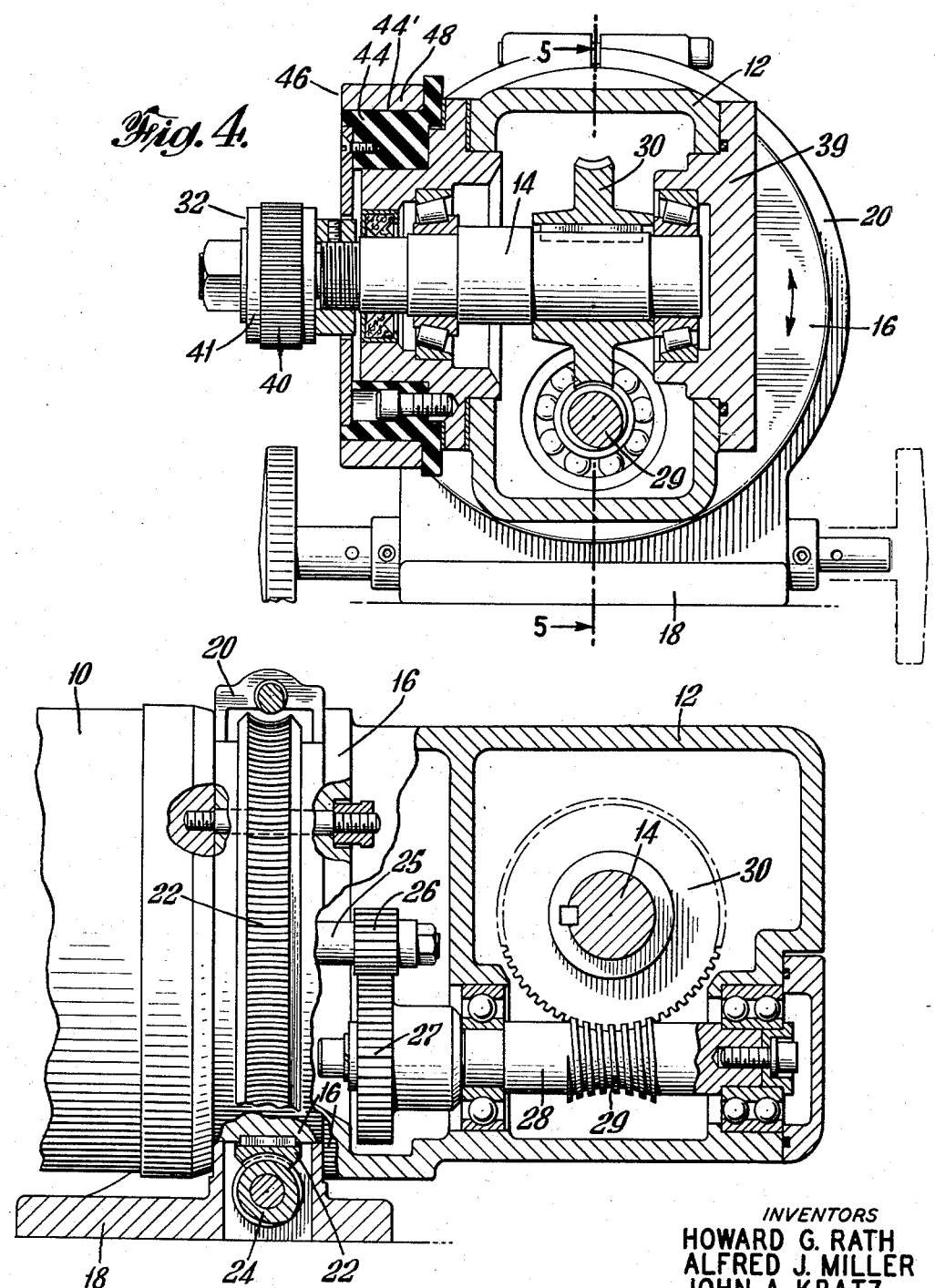
INVENTORS
HOWARD G. RATH
ALFRED J. MILLER
JOHN A. KRATZ
BY Richard S. Shreve Jr.
ATTORNEY

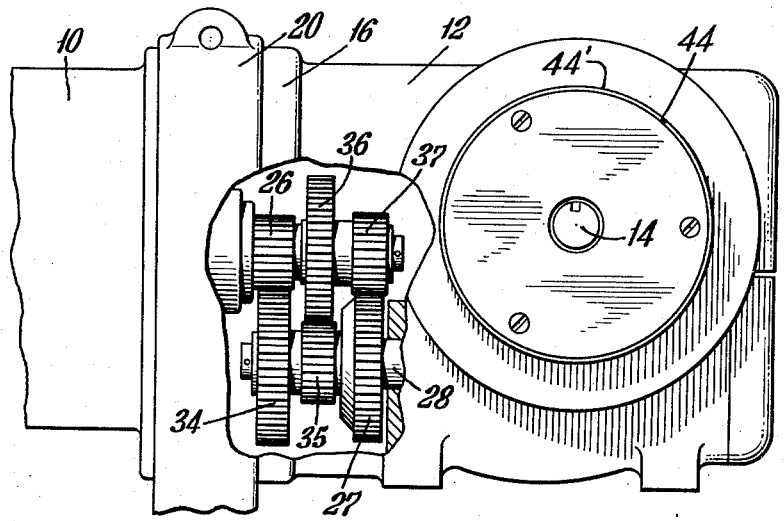
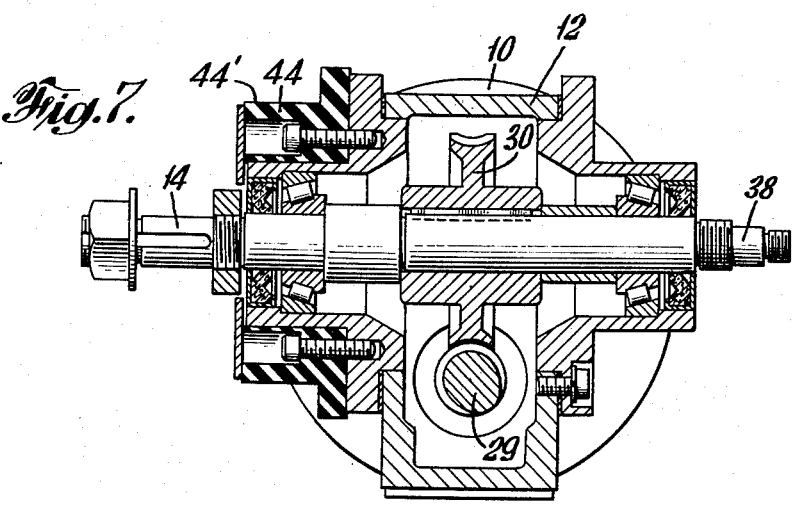
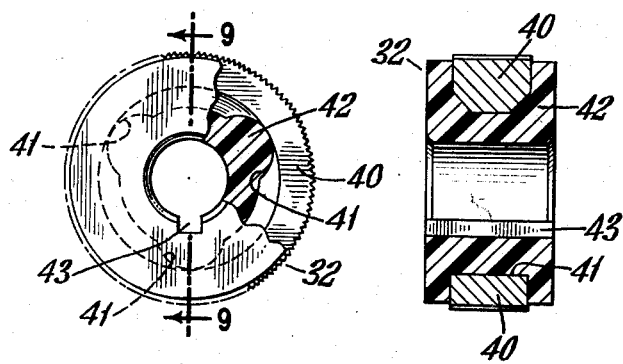
INVENTORS
HOWARD G. RATH
ALFRED J. MILLER
JOHN A. KRATZ United States Patent Office 2,925,170
Patented Feb. 16, 1960

2,925,170

WIRE FEEDER

Howard G. Rath, Fanwood, and Alfred J. Miller, Westfield, N.J., and John A. Kratz, Bronxville, N.Y., assignors to Union Carbide Corporation, a corporation of New York Application May 9, 1956, Serial No. 583,870

6 Claims. (Cl. 203—250)

This invention relates to wire feeders, and more particularly to apparatus of this character for feeding wire to electric arc processes such as welding and cutting in which the wire is fed at a speed which is a function of the burn off rate of the wire.

Heretofore wire feeders have comprised a gear reduction unit driven by a motor and driving a wire feed roll, a wire back up roll for holding the wire against the feed roll, and a wire transport system for leading the wire from a source of supply to the feed roll and thence to the arc zone, at a controlled rate consistent with the process requirements. However different apparatus has been provided for each of several different processes.

In submerged arc welding in which the arc is shielded beneath a blanket of granular flux a characteristic apparatus was developed. In inert gas shielded metal arc welding known as sigma welding, different apparatus was provided for feeding smaller than normal wire at higher than normal speeds and carrying higher than normal current densities. The greater flexibility of the smaller wire caused the problem of buckling or shaving of the wire, and the gas shielding caused the problem of delivering the wire centrally through the gas cup for uniform shielding.

In magnetic flux welding, a revolving magnet is employed to feed the flux at a constant rate and the wire feeder has the problem of driving the revolving magnet as well as the wire. In semi-automatic tungsten arc welding filler wire is fed to the tungsten arc, and the previous wire feeders were not suitable for this process.

The main objects of the present invention are to avoid the difficulties referred to above, and to provide a wire feeder satisfactory for and interchangeable in the various consumable wire processes.

According to the present invention, the wire feeder comprises a motor gear reduction unit of symmetrical casing construction and having a transverse feed roll shaft, means for adjusting said unit about the motor axis to a selected angle, an accessory support bracket, and means for adjusting the accessory support bracket about the axis of said feed roll shaft to a selected angle of wire feed. Preferably the adjustment about the motor axis is provided by a concentric mounting ring clamp and a mating circular surface on the motor gear reduction unit. Preferably the gear reduction unit has an insulating shoulder concentric with the feed roll shaft, and the accessory bracket has a circular clamp for adjustment about the feed roll shaft. The gear reduction unit preferably journals a double enveloping worm gear and worm shaft, and the feed roll preferably has a hollow interior in which is molded a plastic hub keyed to the worm gear shaft. The accessory bracket has inlet and outlet sockets aligned with the periphery of the feed roll for interchangeably receiving equipment such as wire straighteners and torches. The assembly is adjustable to provide right and left hand feed or reverse feed, and the feed roll shaft is preferably double ended to provide simultaneous wire feed, or to drive accessory equipment.

In the drawings:

Fig. 4 is a transverse section through the gear reduction unit axially of the feed roll shaft;

Fig. 5 is a longitudinal section taken along the line 5—5 of Fig. 4;

Fig. 6 is an elevation of a modified gear reduction unit broken away to show the gear train;

Fig. 7 is a modified form of Fig. 4, showing the double ended feed roll shaft;

Fig. 8 is an end elevation partly in section of the feed roll cast plastic hub; and Fig. 9 is a section taken along line 9—9 of Fig. 8.

Figure 1:
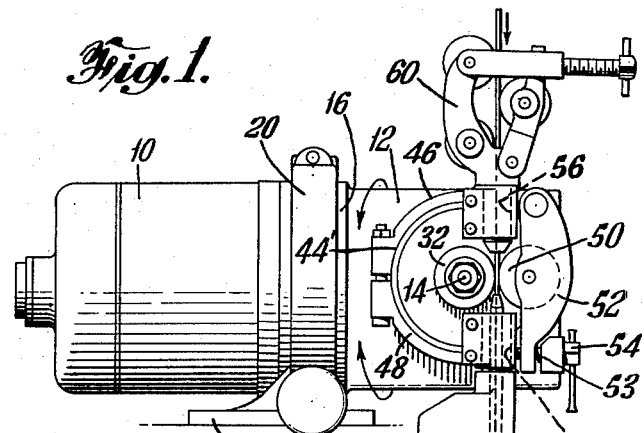
Fig. 1 is a side elevation of a wire feeder according to the preferred embodiment of the present invention.
Figure 2:
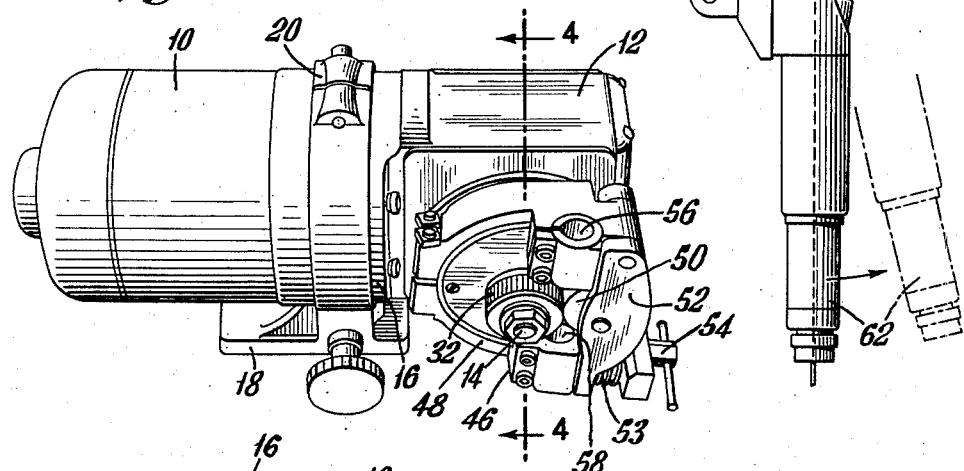
Fig. 2 is a perspective view of the same.
Figure 3:
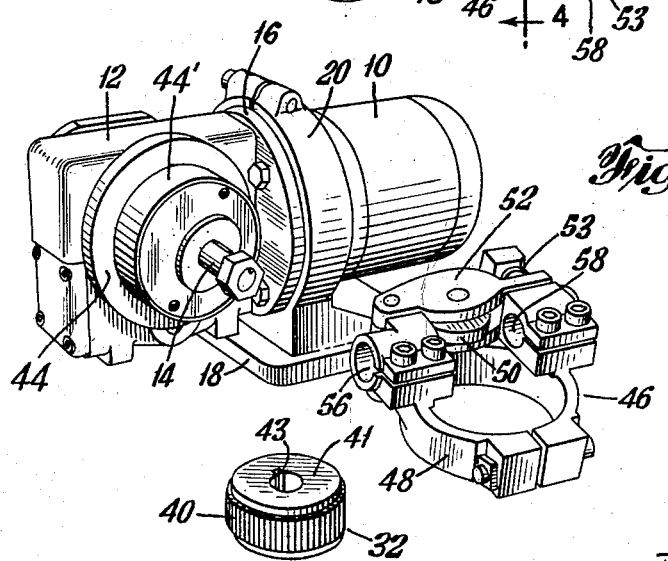
Fig. 3 is a perspective view at another angle showing parts disassembled.

The wire feeder shown in the drawings comprises a motor 10 and a gear reduction box 12 secured together as a unit. The box 12 journals a feed shaft 14 transverse to the motor shaft, and the entire unit is mounted for adjustment of the feed shaft 14 about the motor axis to any selected angle of wire feed in a plane radial to the motor axis. For this purpose the unit is provided with a circular surface 16, and a mating mounting ring 18 is provided with a circular clamp 20 engaging the flange 16. The flange 16 may be provided with a worm gear 22, as shown in Fig. 5, and turned by a worm 24 for precision adjustment when the clamp 20 is loosened.

The motor 10 has a shaft 25 with a pinion 26 keyed thereon and meshing with a gear 27 keyed on a worm shaft 28 journaled in the gear box 12. The shaft 28 has an enveloping worm 29 driving an enveloping worm gear 30 keyed on the feed shaft 14. The double enveloping worm and gear drive contribute to the precision control of speed of the wire feed as a function of wire burn off rate. A wire feed roll 32 is keyed on one end of the feed shaft 14. At the other end a removable plate 39 is provided for access to the shaft 14 and gearing.

A three stage form of gear train is shown in Fig. 6. The motor pinion 26 drives a gear 34 on a sleeve with a pinion 35, meshing with a gear 36 on sleeve with a pinion 37. The pinion 37 meshes with the gear 27 keyed on the worm shaft 28.

A double ended feed roll shaft is shown in Fig. 7. The second end 38 extends beyond its journal in the gear box 12, and as shown may receive a gear to drive a rotary magnet for feeding magnetic flux in timed relation to the wire feed, or may be modified to receive a second wire feed roll for driving a second wire.

The wire feed roll 32 is shown in detail in Figs. 8 and 9. The knurled metal rim 40 has a hollow interior 41 shown as a three-lobed boring, in which is cast a plastic hub 42 having a keyway 43 for fixing the roll 32 onto the feed shaft 14. This eliminates tedious machining otherwise required to prevent eccentricity of the rim 40, when fitting insulation between the rim and the drive shaft.

Bolted to the side of the gear box 12 is an insulating peripheral shoulder 44 concentric with the feed shaft 14 on which is mounted an accessory bracket 46. The bracket 46 has a circular clamp 48 adjustably engaging the shoulder 44. A wire back up roll 50 is journaled in an arm 52 pivoted on the bracket 46 and pressed toward the feed roll 32 by a spring 53 compressed by a screw 54. The arm 52 being precision pivoted on the bracket 46 determines a fixed point of tangency for the back up roll 50 against the feed roll 32.

The accessory bracket has a fixed inlet guide socket 56 and a fixed outlet guide socket 58 aligned with the nip between the back up roll 50 and the feed roll 32. This alignment is preserved in all positions of adjustment of the bracket 46 about the peripheral shoulder 44 concentric with the feed roll shaft.

Fig. 1 shows a wire straightener 60 mounted in the inlet socket 56, and a torch 62 mounted in the outlet socket 58. These are interchangeable with each other and other accessory fittings. The wire can be fed in either direction by interchanging component parts of accessory fittings.

To convert a right hand drive to a left hand drive, the plate 39 is removed and the shaft 14 and gearing reversed, to bring the feed roll 32 to the opposite side. Then the accessory clamp 46 is turned 180° on the peripheral shoulder 44. Inasmuch as this brings the back up roll 50 to the other side of the feed roll 32, the wire guide 60 is taken out of the inlet socket 56 and mounted in outlet socket 58, from which the torch 62 is removed and inserted in socket 56.

What is claimed is:

1. Wire feeder comprising a motor gear reduction unit including a motor having a motor shaft and a gear box secured to said motor and journaling a feed roll shaft transverse to said motor shaft, a wire feed roll keyed on said transverse feed roll shaft, a mounting ring having a circular internal surface concentric with said motor shaft, said motor gear reduction unit having a circular external surface concentric with said motor shaft and mating with said internal surface and rotatable therein for adjusting said unit about the motor axis to a selected angle of said feed roll shaft in a plane radial to the motor axis, an accessory support bracket, a wire guide back up roll yieldably mounted on said accessory support bracket and journaled eccentric to said feed roll shaft, means mounted on said bracket for urging said back up roll toward said wire feed roll, and means for adjusting said accessory support bracket about the axis of said feed roll shaft to a selected angle of wire feed in a plane radial to said feed roll shaft.

2. Wire feeder comprising a motor gear reduction unit including a motor having a motor shaft and a gear box secured to said motor and journaling a feed roll shaft transverse to said motor shaft, a wire feed roll keyed on said transverse feed roll shaft, a mounting ring having a circular internal surface concentric with said motor shaft, said motor gear reduction unit having a circular external surface concentric with said motor shaft and mating with said internal surface and rotatable therein, said mounting ring having a clamp engaging said circular external surface of said unit therein to selectively hold said feed roll shaft in any desired angular wire feed position about the motor axis with respect to said mounting ring, an accessory support bracket, a wire guide back-up roll mounted on said accessory support bracket eccentric to said feed roll shaft, means on said bracket for urging said back-up roll toward said wire feed roll, and means for adjusting said accessory support bracket about the axis of said feed roll shaft to a selected angle of wire feed in a plane radial to said feed roll shaft.

3. Wire feeder comprising a motor gear reduction unit including a motor having a motor shaft and a gear box secured to said motor and journaling a feed roll shaft transverse to said feed roll shaft, a wire feed roll keyed on said transverse feed roll shaft, a mounting ring having a circular internal surface concentric with said motor shaft, said motor gear reduction unit having a circular external surface concentric with said motor shaft and mating with said internal surface and rotatable therein, said gear box journaling a double enveloping gear and worm driving said transverse feed roll shaft, said feed roll having a hollow interior with a plastic hub moulded therein and keyed on said shaft, means for adjusting said unit about the motor axis to a selected angle of said feed roll shaft, an accessory support bracket, a wire guide back up roll yieldably mounted on said accessory support bracket and journaled eccentric to said feed roll shaft, means mounted on said bracket for urging said back up roll toward said wire feed roll, and means for adjusting said bracket about the axis of said plastic feed roll hub.

4. Wire feeder comprising a motor gear reduction unit including a motor having a motor shaft and a gear box secured to said motor and journaling a feed roll shaft transverse to said motor shaft, a wire feed roll keyed on said transverse feed roll shaft, a mounting ring having a circular internal surface concentric with said motor shaft, said motor gear reduction unit having a circular external surface concentric with said motor shaft and mating with said internal surface and rotatable therein, an external peripheral shoulder of insulating material secured to said unit concentric with said wire engaging feed roll, and an accessory support bracket, a wire guide back-up roll yieldably mounted on said accessory support bracket and journaled eccentric to said feed roll shaft, means mounted on said bracket for urging said back-up roll toward said wire feed roll, said bracket having a circular clamp engaging said insulating peripheral shoulder for adjustment to any selected angle of wire feed about the axis of said wire engaging feed roll.

5. Wire feeder comprising a motor gear reduction unit including a motor shaft and a gear box secured to said motor and journaling a feed roll shaft transverse to said motor shaft, a wire feed roll keyed on said transverse feed roll shaft, a mounting ring having a circular internal surface concentric with said motor shaft, said motor gear reduction unit having a circular external surface concentric with said motor shaft and mating with said internal surface and rotatable therein for adjusting said unit about the motor axis to a selected angle of said feed roll shaft in a plane radial to the motor axis, an accessory support bracket, a wire guide back-up roll yieldably mounted on said accessory support bracket and journaled eccentric to said feed roll shaft, means mounted on said bracket for urging said back-up roll toward said wire feed roll, means for adjusting said accessory support bracket about the axis of said wire feed roll to a selected angle of wire feed in a plane radial to said feed roll and inlet and outlet sockets fixed on said accessory support bracket in alignment with and tangent to said wire feed roll in all positions of adjustment.

6. Wire feeder comprising a motor gear reduction unit including a motor having a motor shaft and a gear box secured to said motor and journaling a feed roll shaft transverse to said motor shaft, a wire feed roll keyed on said transverse feed roll shaft, a mounting ring having a circular internal surface concentric with said motor shaft, said motor gear reduction unit having a circular external surface concentric with said motor shaft and mating with said internal surface and rotatable therein for adjusting said unit about the motor axis to a selected angle of said feed roll shaft in a plane radial to the motor axis, an accessory support bracket, a wire guide back-up roll yieldably mounted on said accessory support bracket and journaled eccentric to said feed roll shaft, means mounted on said bracket for urging said back-up roll toward said wire feed roll, means for adjusting said accessory support bracket about the axis of said feed roll shaft to a selected angle of wire feed in a plane radial to said feed roll shaft, the other end of said feed roll shaft projecting clear out of the other side of said gear box and forming a driving head for feeding other material in timed relation to the wire feed.

(References on following page)

References Cited in the file of this patent

UNITED STATES PATENTS

| | | |
|---|---|---|
| 1,235,734 | Stange | Aug. 7, 1917 |
| 1,700,736 | Brennan | Feb. 5, 1929 |
| 1,733,812 | MacRae | Oct. 29, 1929 |
| 2,066,163 | Stephens | Dec. 29, 1936 |
| 2,079,956 | Burgett | May 11, 1937 |
| 2,182,575 | Baird et al. | Dec. 5, 1939 |
| 2,453,817 | Shalkhauser | Nov. 16, 1948 |
| 2,499,066 | Jacobson | Feb. 28, 1950 |
| 2,619,845 | Mackman et al. | Dec. 2, 1952 |
| 2,796,168 | Clary et al. | June 18, 1957 |

OTHER REFERENCES

"Machine Design," Designing Fabricated Nylon Parts, March 1954, pp. 153–159, copy in Sci. Lib. and Div. 12.